United States Patent Office 2,693,067
Patented Nov. 2, 1954

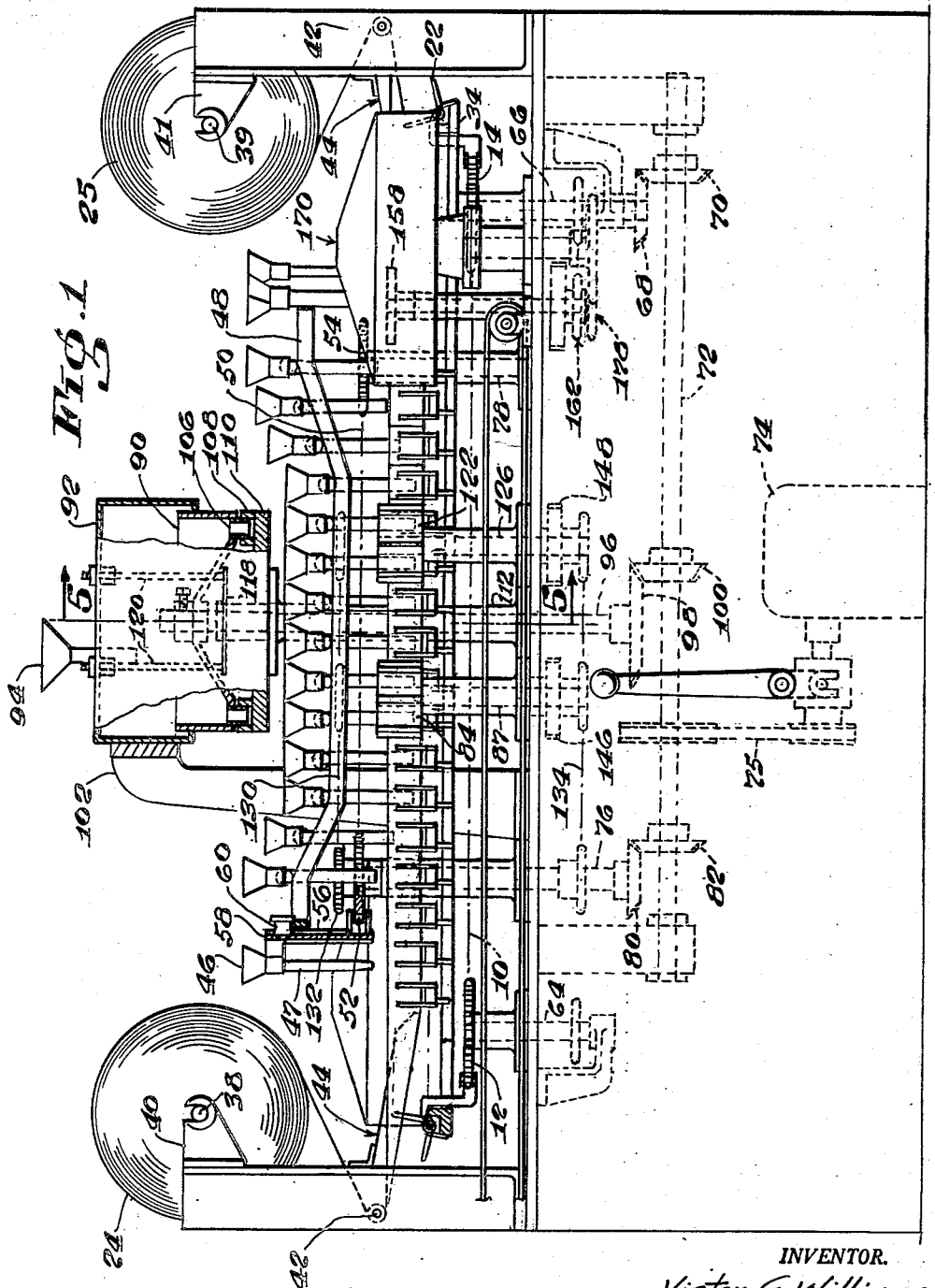

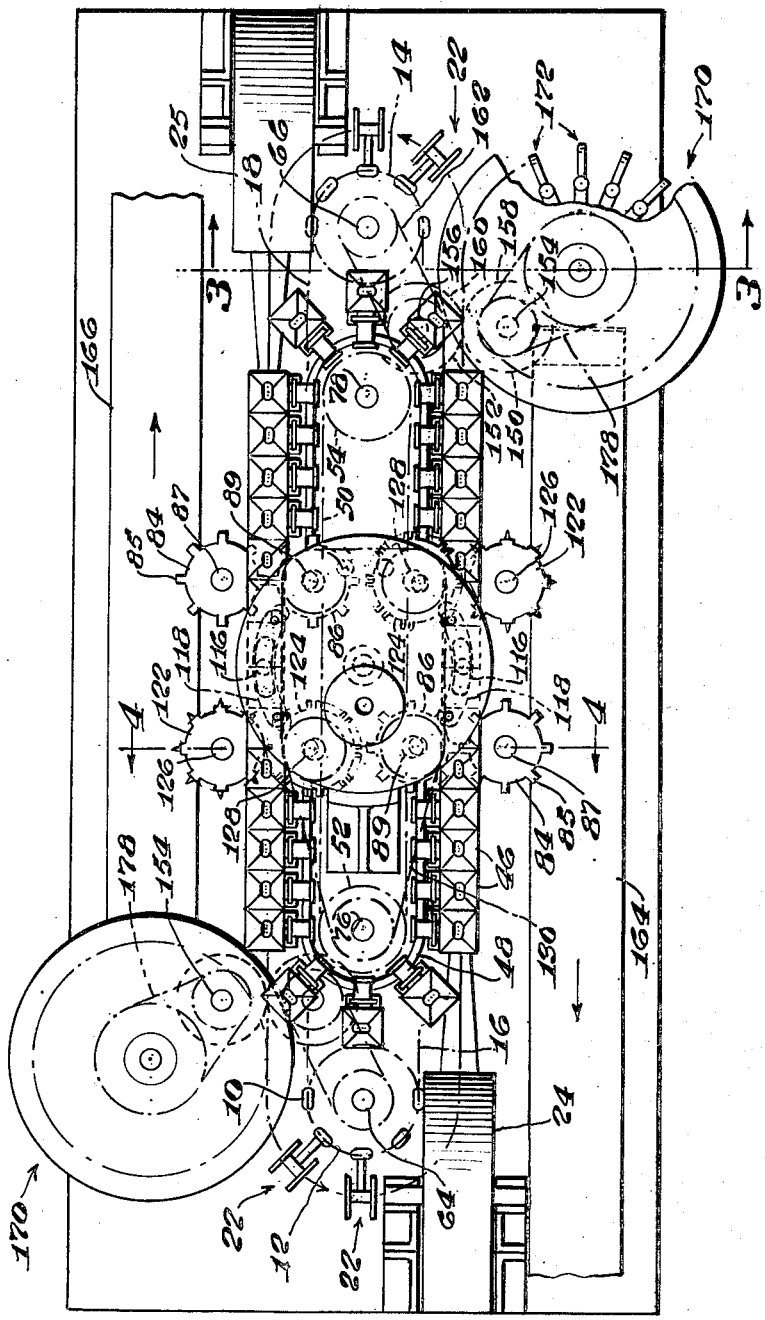

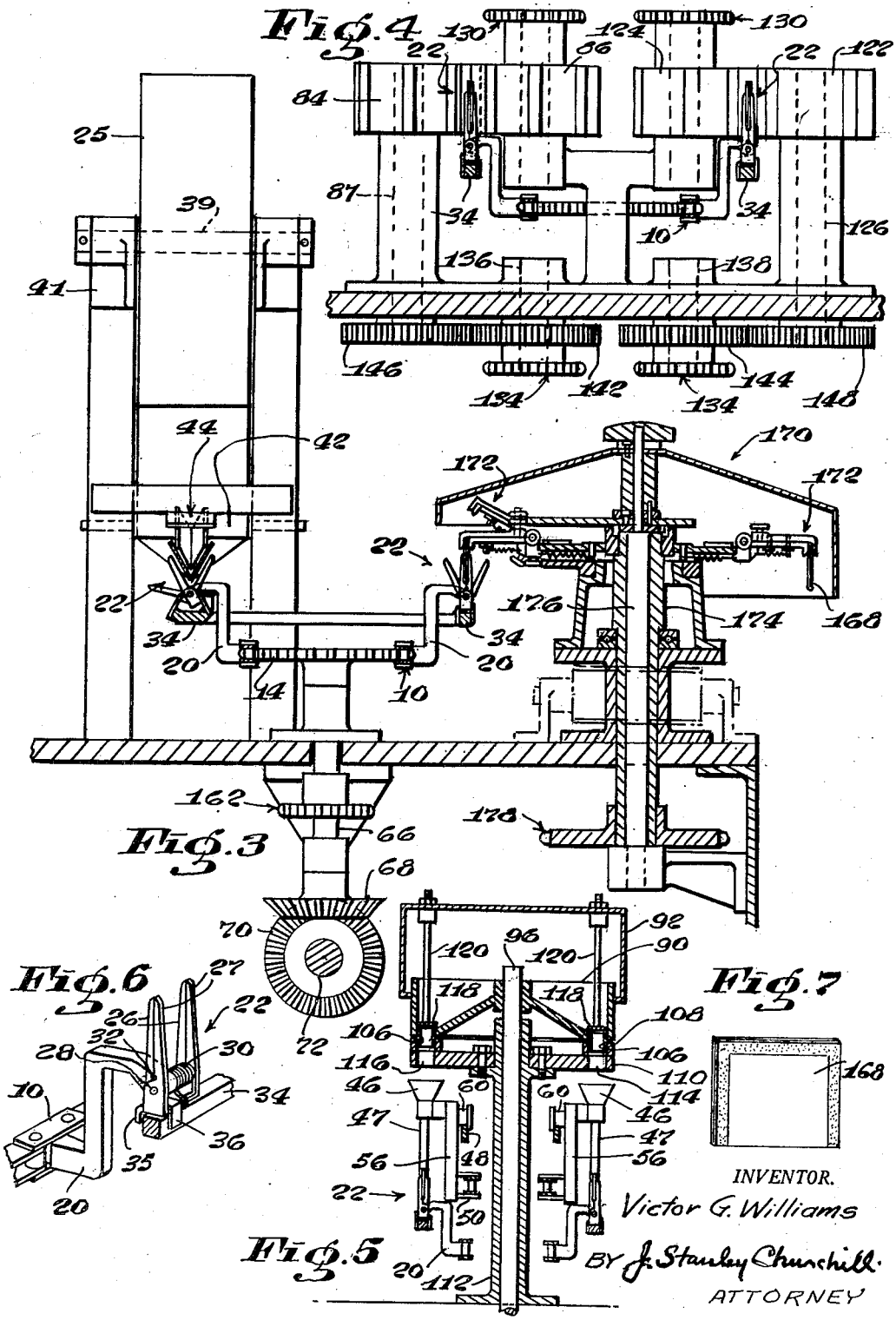

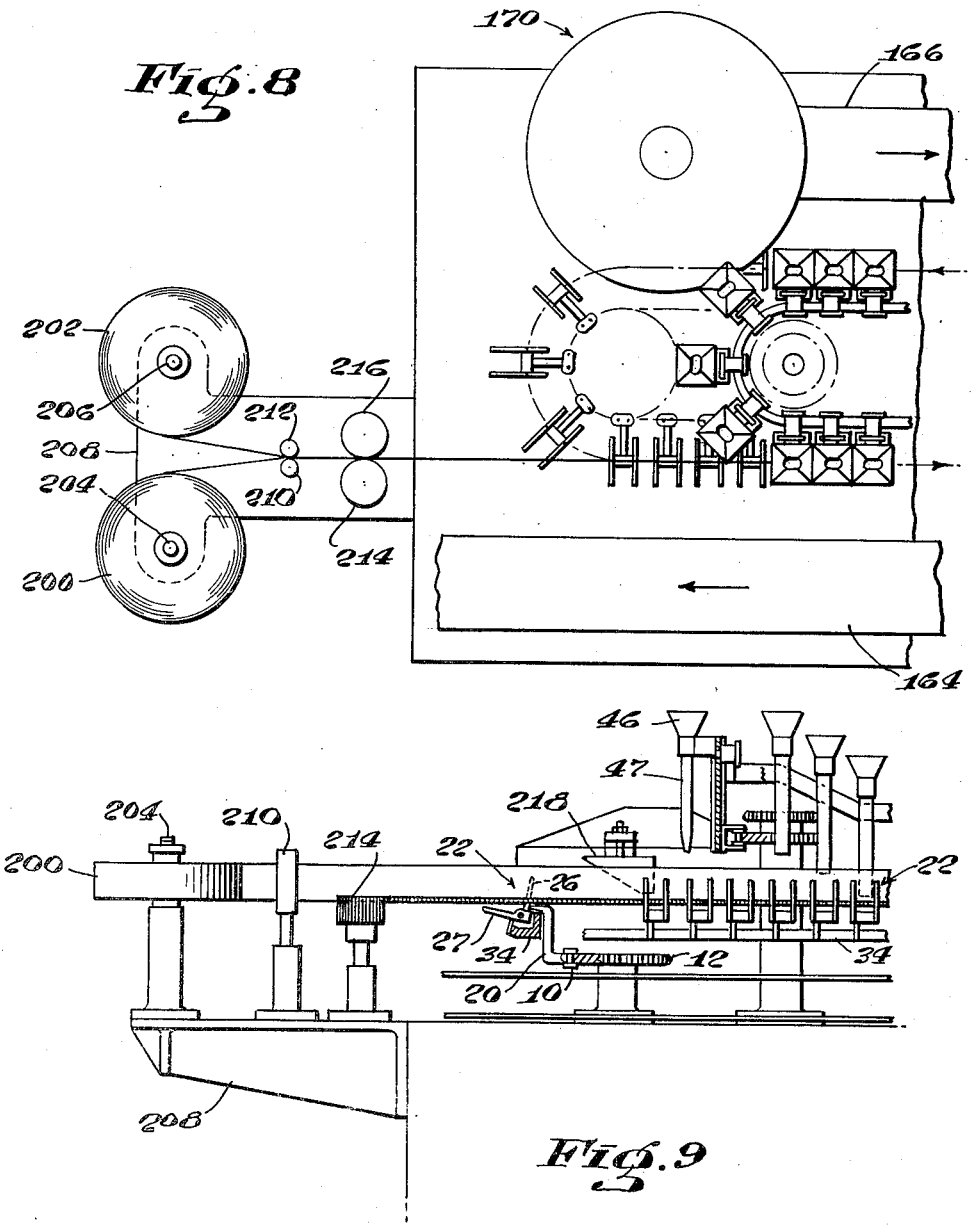

2,693,067

BAG-MAKING, FILLING, AND CLOSING APPARATUS

Victor G. Williams, Toronto, Ontario, Canada, assignor to Delamere & Williams Company, Limited, Toronto, Ontario, Canada, a corporation of Ontario Application December 17, 1952, Serial No. 326,450

18 Claims. (Cl. 53—86)

This invention relates to bag-making, filling and closing apparatus, particularly for producing tea bags and the like.

The invention has for an object to provide a novel bag-making, closing and filling machine capable of producing individual filled and closed bags, such as tea bags, in an economical and rapid manner.

With this general object in view and such others as may hereinafter appear, the invention consists in the bag-making, filling and closing apparatus and in the various structures, arrangements and combinations of parts hereinafter described and particularly defined in the claims at the end of this specification.

In the drawings illustrating the preferred embodiment of the invention: Fig. 1 is a side elevation of a tea-bagging machine embodying the invention; Fig. 2 is a plan view of the same; Fig. 3 is a cross-sectional view taken on the line 3—3 of Fig. 2; Fig. 4 is a side elevation of side-seam sealing and severing mechanism as viewed from the line 4—4 of Fig. 2; Fig. 5 is a cross-sectional view of the material-filling mechanism taken on the line 5—5 of Fig. 1; Fig. 6 is a perspective detail view of the carrier grippers; Fig. 7 is a perspective view of a tea bag produced by the present apparatus; Fig. 8 is a plan view of a portion of a modified form of tea-bagging machine embodying the present invention; Fig. 9 is a side elevation of the machine shown in Fig. 8; and Fig. 10 is a perspective view of a tea bag produced by the modified apparatus shown in Figs. 8 and 9.

In general, the present invention contemplates the provision of novel bag-making, filling and closing apparatus which is characterized by an elongated endless conveyor having two spaced parallel runs and which is arranged to be continuously operated during the operation of the machine. The conveyer is provided with a plurality of spaced grippers for gripping individual strips of bag-forming material guided into operative position to be gripped by said grippers at the beginning of each of the parallel runs of the conveyer. Provision is made during the continuous advance of the bag-forming material through each run for forming a plurality of connected bag sections open at their tops, closing the sides of the bag sections, filling the bag sections with a commodity, severing the bag sections along their side edges and closing the tops of the bags. Preferably, the filling operation may be performed by a single filling mechanism serving both runs.

Referring now to the drawings, as therein shown the preferred apparatus for simultaneously producing bags from two strips of bag-forming material includes an endless carrier or conveyer in the form of a chain 10 which is arranged to run around sprockets 12, 14 at each end of the machine providing two spaced and parallel runs 16, 18, one in each side of the machine. Projecting from the chain 10 are a plurality of equally spaced arms 20 on which are pivotally mounted grippers, indicated generally at 22. As illustrated in Fig. 2, provision is made for supporting two rolls 24, 25 of bag-forming material, one on each side of the machine, and a strip of bag-forming material is withdrawn from each roll and advanced along its respective run by the grippers 22 for cooperation with the mechanisms for performing the various operations upon the two strips to simultaneously produce two sets of bags.

As shown in detail in Fig. 6, the grippers 22 comprise U-shaped fingers 26, 27 rockingly mounted on a pivot pin 28 which extends through the end of arm 20 and are adapted to swing on the pivot pin so as to bring the opposed fingers together and clamp a strip of bag-forming material between them. A coil spring 30 passes around pivot pin 28 and engages the cross pieces of the fingers tending to force them together. A pin 32 mounted on arm 20 extends axially of the pin 28 between the fingers 26, 27 and acts as a stop to hold them in a vertical position when closed.

In operation, the grippers 22 are arranged to slide on a bar or track 34, the fingers 26, 27 being provided with downwardly extended lugs 35, 36 at each side for engagement with the sides of the track 34. At the point where the strip of bag-forming material is fed to the machine, the track 34 is spread, as shown in Fig. 3, thus forcing the lugs outwardly and spreading the gripper members so that the bag-forming material may be fed between them. When the material has been fed between them, the track 34 narrows permitting the gripper members to close under the influence of the spring 30, thus gripping the folded bag material.

The bag-forming material preferably comprises a porous, fibrous material containing a thermoplastic heat and pressure-responsive binding material so that when two layers or plies of the material are brought together in face-to-face contact and subjected to the application of heat and pressure, they will become and remain adhesively united. As herein shown, the rolls of bag-forming material 24, 25 supplying the runs 16, 18 respectively are mounted on spindles 38, 39 carried in brackets 40, 41 attached to the machine frame, and each strip passes around a guide roller 42 and under suitable guide bars, indicated generally at 44, for guiding the strip between the open grippers and for folding the strip longitudinally. In operation, the continuously moving grippers are gradually closed upon the strip as the track 34 narrows, and the strips thus gripped between the jaws of the grippers on each run of the carrier are continuously conveyed into operative relation to the filling and sealing mechanisms, to be described. The fingers of each gripper 22 are spaced apart a distance equivalent to rather less than the width of the interior of the completed bag, and the fingers of adjacent grippers are spaced from each other sufficiently to leave a space between them to provide for transverse sealing and the introduction of the sealing mechanism.

As illustrated in Figs. 1 and 3, the strip of bag-forming material is preferably fed between the grippers 22 in a plane substantially coextensive with the horizontal plane of the carrier, and in order to permit entry of the web at the start of the receiving run of the carrier on each side of the machine, at the points where the grippers run around the sprockets into their respective receiving runs, the track 34 is spread so as to effect rocking of the outer fingers 27 to a substantially horizontal position, as shown, thus preventing interference with the strip as it enters at these points.

Prior to closing of the grippers on the folded web of material, a plurality of funnels 46 having depending nozzles 47 are carried around an endless track 48 and are brought one by one above the folded paper and dropped so that the lower ends of the nozzles 47 enter between the folds of the paper, and when the grippers come together they fold the paper around the nozzle, thus forming pockets into which the material to be inserted in the bag is subsequently deposited from the funnels 46.

As herein shown, the funnels 46 are mounted above the gripper-carrier chain 10 on a nozzle carrier comprising an endless chain 50 arranged to run around sprockets 52, 54 at each end of the machine providing two spaced and parallel runs, one on each side of the machine, the nozzles 47 being disposed above and in alignment with their respective grippers 22 in each run 16, 18. On the nozzle-carrier chain 50 are suitably mounted a plurality of guides 56 in each of which is mounted a slide 58 carrying a funnel 46 in alignment with a gripper 22. Each slide is provided with a lateral extension such as an anti-friction roller 60 which rides on the track 48. The track 48 is provided with high and low portions for causing the nozzles 47 to be raised and lowered vertically out of and into position for cooperation with the gripper jaws 22 as the nozzles are advanced along each run 16, 18 of the machine.

Provision is made for driving the gripper-carrier chain 10 and the nozzle-carrier chain 50 in timed relation, and as herein shown, the gripper-chain sprockets 12, 14 are mounted on shafts 64, 66 supported in suitable bearings in the machine frame. One of the shafts 66 is provided with a bevel gear 68 meshing with a bevel gear 70 fast on a main drive shaft 72. The main shaft 72 is driven by an electric motor 74 connected to the shaft by a belt and pulley drive 75. The nozzle-carrier chain sprockets 52, 54 are mounted on shafts 76, 78 spaced inwardly from the shafts 64, 66, one of the shafts, 76 being connected to the main drive shaft 72 by bevel gears 80, 82. Thus, in operation, the nozzles 47 are raised and lowered into operative relation to the grippers 22 on each run of the machine as they are continuously advanced therethrough.

When the nozzles in each run 16, 18 have been fully lowered into their respective grippers 22 and the latter have been fully closed upon the folded web, provision is made for sealing the webs transversely at spaced intervals to form successive connected bag sections. As herein shown, the transverse heat-sealing mechanism may include a pair of driven rollers 84, 86 having raised portions 85 thereon arranged to cooperatively engage and press the strip at spaced intervals to effect the sealing operation. One of the rollers of each pair may be provided with a heating element of any usual or preferred design and in operation, corresponding raised portions of each pair of rollers are arranged to cooperate to perform the heat-sealing operation as the strip of heat-sealing material is advanced, the circumferential spacing of the raised portions being such as to enter in the space between adjacent grippers 22 carried by the chain 10. The rollers 84, 86 are mounted on vertical shafts 87, 89 respectively, and in operation, the rollers in each run are rotated in timed relation to the rate of movement of the webs of bag-forming material through driving mechanism to be described.

The filling mechanism includes a single centrally located feed hopper 90 containing a supply of the tea to be inserted into the bag sections, the illustrated hopper being arranged to simultaneously supply successive bag sections of the webs carried by both runs 16, 18 with successive measured charges of tea. As herein shown, the hopper 90 is provided with a cover 92 having a funnel 94 in the top thereof through which tea may be fed into the hopper. The hopper 90 is secured to a vertical shaft 96 arranged to be rotated from the main drive shaft 72 by bevel gears 98, 100. The cover 92, however, is fixed relative to the hopper 90, the cover being mounted on a supporting bracket 102 attached to the machine frame. In the bottom of the hopper are formed a plurality of holes arranged annularly of the hopper, and suitably secured in these holes are a plurality of tubular chambers 106 adapted to receive and measure the quantity of tea to be inserted in the bag sections. The tubular chambers 106 are telescopically fitted in the holes formed in a ring 108 which turns with the hopper. The openings in the ring form extensions of the measuring chambers, and by raising and lowering the ring relative to the bottom of the hopper the capacities of the chambers may be varied. The ring 108 is rotatably supported on a stationary disk 110 which may be adjustably secured to the upper end of a bearing bracket 112 attached to the machine frame and in which the shaft 96 is rotatably supported.

In operation, the tea in the hopper drops into the chambers 106, and the stationary disk 110 prevents the tea from spilling out of the chambers until they reach elongated discharge openings 114, 116 formed in opposite sides of the disk 110 for cooperation with the funnels being advanced in both runs of the machine. The measuring chambers are arranged to be cut off from the tea in the hopper, as they come into register with the discharge openings, by stationary scrapers 118 which may be supported just above the tops of the chambers 106 by rods 120 attached to the stationary cover 92, as shown. In operation, as successive funnels 46 in each run 16, 18 pass beneath their respective openings 114, 116 they receive the contents of a measuring chamber to be received by the bag sections carried by the grippers 22. Thereafter, provision is made for severing the strips transversely through the transverse seals to form individual bags.

As herein illustrated, a transverse severing mechanism is provided for each run 16, 18, each mechanism comprising cooperating rollers including a cutting roll 122 and a die or anvil roll 124. The cutter blades are spaced about the periphery of the roll 122 a distance equal to the width of the bag sections for cooperation with the correspondingly spaced die sections in the roll 124. As shown, the blade and die sections are formed on extended portions of the rolls to permit entry between adjacent grippers 22 to effect the severing operations through the medial portions of successive transverse seals formed in the webs. The cutter and die rolls 122, 124 for each run 16, 18 are mounted on vertical shafts 126, 128 and are arranged to be rotated in timed relation to the advance of the webs through driving mechanism also connected to drive the transverse heat-sealing rollers 84, 86. As illustrated in Figs. 2 and 4, the inner rolls of each pair of transverse heat-sealing and severing mechanisms are connected by an upper chain and sprocket drive indicated at 130 which is driven by a sprocket 132 fast on the vertical shaft 76. The outer rolls of each pair are arranged to be driven by a similar lower chain and sprocket drive 134 also driven from the shaft 76 and connected to sprockets mounted on studs 136, 138 arranged below and in alignment with the inner roll shafts. The studs 136, 138 are provided with spur gears 142, 144 respectively arranged to mesh with similar gears 146, 148 fast on the lower ends of the outer roller shafts 87, 126 to drive the outer rollers in timed relation to their cooperating inner rollers.

From the description thus far it will be observed that the webs of bag-forming material in the runs 16, 18 are simultaneously withdrawn and advanced along their respective runs to be sealed transversely to form connected bag sections which are subsequently provided with successive charges of tea from the material-feeding mechanism serving both runs and are then severed transversely through the sealed portions to form individual filled bags. After the severing operation, the funnels 46 are elevated by the cam track 48 to withdraw the nozzles 47 from the bag sections, and thereafter provision is made for heat sealing the mouths of the bags as they are continuously advanced by their grippers 22.

The mouth-sealing operation may be performed by a pair of cooperating rollers 150, 152, one of which may be heated in any usual or preferred manner, the rollers being engageable with opposite sides of the upper edges of the bags advanced between the rollers by the grippers 22. Similar mouth-sealing mechanism is provided on each side of the machine for cooperation with the bags being advanced along their respective runs 16, 18. As shown in Fig. 2, the rollers 150, 152 are mounted on vertical shafts 154, 156 respectively which are connected for rotation in opposite directions by spur gears 158, 160. At one end of the machine the shaft 156 is connected by a chain and sprocket drive 162 to the gripper-chain shaft 66. At the other end of the machine the corresponding shaft is connected by a similar chain and sprocket drive to the vertical shaft 64. The drives are preferably arranged to effect continuous rotation of the sealing rollers at a surface speed equal to the rate of advance of the bags.

After the mouths of the bags have been sealed, provision is made for removing the filled and sealed bags 168 from the grippers 22 in each run 16, 18 and transferring the same to their respective delivery belts 164, 166. The transfer mechanisms, indicated generally at 170, may comprise mechanism similar to that illustrated and described in my United States Patent No. 2,556,382 issued June 12, 1951, only sufficient portions thereof being herein shown and described to enable the present invention to be understood. As herein shown, in general, each transfer mechanism includes a plurality of radially arranged cam-actuated fingers, indicated at 172, arranged to grip the bags and withdraw them from the grippers at a point where the track 34 widens to open the grippers and release the bags. The radially extended fingers 172 are carried by a sleeve 174 rotatably mounted on a vertical post 176 for cooperation with stationary cams arranged to cause the fingers to clamp the bags one by one before the jaws of the grippers are opened, and then swing the bags upwardly clear of the grippers after the jaws thereof are opened, and then deposit the bags on the delivery conveyer, as more fully described in said patent. As herein shown, the sleeve 176 may be rotated in timed relation to the advance of the gripper chain through driving mechanism including a chain and sprocket drive 178 connecting the shaft 154 to the sleeve 174. The delivery belts 164, 166 may be of any usual or preferred construction.

As illustrated in Figs. 8 and 9, a modified form of bag-making, filling and closing machine embodying the present invention is adapted to form filled and sealed bags in each run of the machine from two strips of bag-forming material sealed together along their bottom edges and fed into operative relation to the carrier to be gripped and advanced, as described. As shown in Fig. 8, two rolls of bag-forming material 200, 202 are supported horizontally on vertical spindles 204, 206 carried in standards attached to a bracket 208 extended from the machine frame. In operation, the two strips of bag-forming material withdrawn from the supply rolls are passed between idler rolls 210, 212 to bring the strips together in face-to-face contact, and the combined strips are then passed between cooperating heat-sealing rolls 214, 216 arranged to seal the strips together along their bottom edges to form a unitary strip sealed along the bottom and open at the top edge. The idler rolls and the heat-sealing rolls may also be supported by the bracket 208 as shown, and the strip thus formed in a plane coextensive with the gripper carrier may be fed directly into the machine between the open grippers 22, the outer fingers 27 of the grippers being rocked outwardly to a substantially horizontal position as they pass around the sprockets into the receiving runs to permit entry of the strip, as described. A suitable wedge-shaped member 218 may be supported to extend between the two sides of the strip passing between the open grippers to open the top of the strip to permit entry of the filling nozzles 47 therebetween during the advance of the strip. It will be understood that the same strip-forming and bottom-sealing mechanism may be provided on both runs of the machine and that the transverse sealing, filling, severing and top-closing mechanisms may be similar to those previously described. Fig. 10 illustrates a bag 220 formed from two sheets of bag-forming material and sealed along four edges as produced on the modified form of machine illustrated in Figs. 8 and 9.

From the above description it will be seen that the present tea-bagging machine is adapted to simultaneously produce filled and sealed tea bags from two webs of tea-bagging material carried along opposite runs of the carrier chain serving both bag-producing mechanisms. It will also be observed that the illustrated tea-bagging machine is provided with a single material-feeding mechanism including a feed hopper serving both runs and with material-guiding funnels cooperating with the feeding mechanism arranged to travel in alignment with the grippers along portions of both runs whereby to simultaneously produce two series of bags in a rapid, efficient and economical manner.

While the preferred embodiment of the invention has been herein illustrated and described, it will be understood that the invention may be embodied in other forms within the scope of the following claims.

Having thus described the invention, what is claimed is:

1. In a bag-making, filling and closing machine, in combination, an endless conveyer mounted to be continuously moved in an elongated, horizontal, closed path providing two substantially straight runs in which the conveyer is moving in opposite directions between the ends of the closed path, said endless conveyer being provided with a plurality of spaced bag-forming and gripping members movable with said conveyer, means for supplying bag-forming material to said conveyer at the beginning of each of said straight runs and in a position to be engaged by the bag-forming and gripping members, means for actuating said bag-forming and gripping members to form said bag-making material into a plurality of connected bag sections open at the tops thereof, means for sealing the side-edge portions of the bag sections held by the gripping members, cutting means for severing the side-edge portions of the bag sections, filling means for introducing a commodity into the bag sections, and means for subsequently sealing the open tops of the filled bag sections, said bag-filling, sealing and severing means operating during the continuous conveyance of the bag sections along the said straight runs.

2. A bag-making, filling and closing machine as defined in claim 1 wherein the bag-forming material supplied to each run is folded into the form of a trough prior to its engagement by the bag-forming and gripping members.

3. In a bag-making, filling and closing machine, in combination, an endless conveyer mounted to be continuously moved in an elongated, horizontal, closed path providing two substantially straight runs in which the conveyer is moving in opposite directions between the ends of the closed path, said endless conveyer being provided with a plurality of spaced bag-forming and gripping members movable with said conveyer, means for supplying bag-forming material to said conveyer at the beginning of each of said straight runs and in a position to be engaged by the bag-forming and gripping members, means for actuating said bag-forming and gripping members to form said bag-making material into a plurality of connected bag sections open at the tops thereof, means for closing the side-edge portions of the bag sections held by the gripping members, cutting means for severing the side-edge portions of the bag sections, filling means for introducing a commodity into the bag sections, and means for subsequently closing the open tops of the filled bag sections, said bag-filling, closing and severing means operating during the continuous conveyance of the bag sections along the said straight runs.

4. A bag-making, filling and closing machine as defined in claim 1 in which provision is made for automatically removing successive formed, filled and closed bags from said grippers at the end of each straight run of the endless conveyer.

5. A bag-making, filling and closing machine as defined in claim 1 wherein the bag-forming material supplied to each run is folded into the form of a trough prior to its engagement by the bag-forming and gripping members, and in which provision is made for automatically removing successive formed, filled and closed bags from said grippers at the end of each straight run of the endless conveyer.

6. A bag-making, filling and closing machine as defined in claim 3 in which provision is made for automatically removing successive formed, filled and closed bags from said grippers at the end of each straight run of the endless conveyer.

7. In a bag-forming, filling and closing machine, in combination, an elongated endless gripper carrier having two spaced and parallel runs for advancing a longitudinally folded strip of bag-forming material in each run, and means in each run for forming, filling and sealing the strips to simultaneously produce a series of bag sections in each run, the filling means comprising a single centrally disposed rotary hopper arranged to deposit measured charges of a commodity into successive bag sections in each run.

8. In a bag-forming, filling and closing machine, in combination, an elongated endless gripper carrier having two spaced and parallel runs for advancing a longitudinally folded strip of bag-forming material in each run, sealing means in each run for sealing its respective strip transversely at spaced intervals to form connected bag sections, bag-filling means arranged to deposit measured charges of a commodity into successive bag sections in each run, severing means in each run for severing successive bag sections from their respective strips to form individual bags, and sealing means in each run for sealing the mouths of the bags.

9. In a bag-forming, filling and closing machine, in combination, an elongated endless gripper carrier having two spaced and parallel runs for advancing a longitudinally folded strip of bag-forming material in each run, sealing means in each run for sealing its respective strip transversely at spaced intervals to form connected bag sections, bag-filling means arranged to deposit measured charges of a commodity into successive bag sections in each run, severing means in each run for severing successive bag sections from their respective strips to form individual bags, sealing means in each run for sealing the mouths of the bags, and means in each run for automatically removing successive bags from their respective runs.

10. In a bag-forming, filling and closing machine, in combination, an elongated endless gripper carrier having two spaced and parallel runs for advancing a longitudinally folded strip of bag-forming material in each run, sealing means in each run for sealing its respective strip transversely at spaced intervals to form connected bag sections, bag-filling means arranged to deposit measured charges of a commodity into successive bag sections in each run, severing means in each run for severing successive bag sections from their respective strips to form individual bags, sealing means in each run for sealing the mouths of the bags, and drive means including driving connections common to the sealing and severing means of each of said runs.

11. In a bag-making, filling and closing machine, in combination, an elongated endless carrier having two spaced and parallel runs and provided with a plurality of equally spaced gripper members for continuously advancing a trough-like strip of bag-forming material in each run, sealing means in each run for sealing its respective strip transversely at spaced intervals to form connected bag sections, a second elongated endless carrier having spaced and parallel runs shorter than said first carrier and provided with a plurality of spaced nozzles arranged to be advanced in alignment with said gripper members and between the folds of said strips for a portion of each gripper-carrier run, bag-filling means comprising a centrally disposed rotary hopper arranged to deposit measured charges of finely divided material into successive nozzles to be received by their respective bag sections in each run, severing means in each run for severing successive bag sections from their respective strips to form individual bags, and sealing means in each run for sealing the mouth portions of the bags after filling thereof.

12. In a bag-making, filling and closing machine, in combination, an elongated endless carrier having two spaced and parallel runs and provided with a plurality of equally spaced gripper members for continuously advancing a trough-like strip of bag-forming material in each run, sealing means in each run for sealing its respective strip transversely at spaced intervals to form connected bag sections, a second elongated endless carrier having spaced and parallel runs shorter than said first carrier and provided with a plurality of spaced nozzles arranged to be advanced in alignment with said gripper members and between the folds of said strips for a portion of each gripper-carrier run, bag-filling means comprising a centrally disposed rotary hopper arranged to deposit measured charges of finely divided material into successive nozzles to be received by their respective bag sections in each run, severing means in each run for severing successive bag sections from their respective strips to form individual bags, sealing means in each run for sealing the mouth portions of the bags after filling thereof, a delivery conveyer adjacent each run, and transfer means disposed at the end of each run for removing successive bags from the grippers of their respective runs and transferring the bags to the adjacent delivery conveyers.

13. In a bag-forming, filling and closing machine, in combination, an elongated endless carrier having two spaced and parallel runs provided with a plurality of equally spaced gripper members, means for supporting a supply roll of bag-forming material at one end of each run, each gripper member comprising a pair of jaws adapted to grip and withdraw the material from its roll, means for folding the material longitudinally as it is withdrawn to provide a longitudinally folded strip in each run, and simultaneously operating means in each run for forming, filling and sealing the strips to produce a series of bag sections in each run, the filling means comprising a single centrally disposed rotary hopper arranged to deposit measured charges of the commodity into successive bag sections of each run.

14. In a bag-forming, filling and closing machine, in combination, an elongated endless carrier having two spaced and parallel runs provided with a plurality of equally spaced gripper members, means for supporting a supply roll of bag-forming material at one end of each run, each gripper member comprising a pair of jaws adapted to grip and withdraw the material from its roll, means for folding the material longitudinally as it is withdrawn to provide a longitudinally folded strip in each run, and simultaneously operating means in each run for forming, filling and sealing the strips to produce a series of bag sections in each run, and filling means for introducing a commodity into the bag sections of each run.

15. In a bag-forming, filling and closing machine, in combination, an elongated endless carrier having two spaced and parallel runs provided with a plurality of equally spaced gripper members, means for supporting a supply roll of bag-forming material at one end of each run, each gripper member comprising a pair of jaws adapted to grip and withdraw the material from its roll, means for folding the material longitudinally as it is withdrawn to provide a longitudinally folded strip in each run, a pair of cooperating sealing rollers in each run for sealing its respective strip transversely at spaced intervals to form connected bag sections, a second elongated endless carrier having spaced and parallel runs shorter than said first carrier and provided with a plurality of spaced nozzles arranged to be advanced in alignment with said gripper members and between the folds of said strips for a portion of each gripper-carrier run, bag-filling means comprising a centrally disposed rotary hopper arranged to deposit measured charges of a commodity into successive nozzles to be received by their respective bag sections in each run, rotary severing means in each run for severing successive bag sections from their respective strips to form individual bags, and a pair of cooperating sealing rolls in each run for sealing the mouth portions of the bags.

16. In a bag-forming, filling and closing machine, in combination, an elongated endless carrier having two spaced and parallel runs provided with a plurality of equally spaced gripper members, means for supporting a supply roll of bag-forming material at one end of each run, each gripper member comprising a pair of jaws adapted to grip and withdraw the material from its roll, means for folding the material longitudinally as it is withdrawn to provide a longitudinally folded strip in each run, a pair of cooperating sealing rollers in each run for sealing its respective strip transversely at spaced intervals to form connected bag sections, a second elongated endless carrier having spaced and parallel runs shorter than said first carrier and provided with a plurality of spaced nozzles arranged to be advanced in alignment with said gripper members and between the folds of said strips for a portion of each gripper-carrier run, bag-filling means comprising a centrally disposed rotary hopper arranged to deposit measured charges of a commodity into successive nozzles to be received by their respective bag sections in each run, rotary severing means in each run for severing successive bag sections from their respective strips to form individual bags, and a pair of cooperating sealing rolls in each run for sealing the mouth portions of the bags, and drive means including driving connections common to the sealing and severing means of both runs.

17. In a bag-forming, filling and closing machine, in combination, an elongated endless carrier having two spaced and parallel runs provided with a plurality of equally spaced gripper members, means for supporting a supply roll of bag-forming material at one end of each run, each gripper member comprising a pair of jaws adapted to grip and withdraw the material from its roll, means for folding the material longitudinally as it is withdrawn to provide a longitudinally folded strip in each run, a pair of cooperating sealing rollers in each run for sealing its respective strip transversely at spaced intervals to form connected bag sections, a second elongated endless carrier having spaced and parallel runs shorter than said first carrier and provided with a plurality of spaced nozzles arranged to be advanced in alignment with said gripper members and between the folds of said strips for a portion of each gripper-carrier run, bag-filling means comprising a centrally disposed rotary hopper arranged to deposit measured charges of a commodity into successive nozzles to be received by their respective bag sections in each run, rotary severing means in each run for severing successive bag sections from their respective strips to form individual bags, and a pair of cooperating sealing rolls in each run for sealing the mouth portions of the bags, a delivery conveyer adjacent each run, and transfer means disposed at the end of each run for removing successive bags from the grippers of their respective runs and transferring the bags to the adjacent delivery conveyers.

18. A bag-making, filling and closing machine as defined in claim 1 wherein two strips of bag-forming material are supplied to each run, and wherein provision is made for sealing together the bottom edges of said two strips to form a unitary bag-forming strip prior to engagement by the bag-forming and gripping members.

No references cited.